(12) United States Patent
Snyder

(10) Patent No.: US 6,825,689 B1
(45) Date of Patent: Nov. 30, 2004

(54) CONFIGURABLE INPUT/OUTPUT INTERFACE FOR A MICROCONTROLLER

(75) Inventor: Warren Snyder, Snohomish, WA (US)

(73) Assignee: Cypress Semiconductor Corporation, San Jose, CA (US)

(*) Notice: Subject to any disclaimer, the term of this patent is extended or adjusted under 35 U.S.C. 154(b) by 405 days.

(21) Appl. No.: 09/953,423

(22) Filed: Sep. 14, 2001

Related U.S. Application Data
(60) Provisional application No. 60/243,708, filed on Oct. 26, 2000.

(51) Int. Cl.[7] ............................................. H03K 19/177
(52) U.S. Cl. .............................. 326/41; 326/37; 326/38
(58) Field of Search ..................................... 326/37–41

(56) References Cited

U.S. PATENT DOCUMENTS

| | | | | |
|---|---|---|---|---|
| 5,202,687 A | | 4/1993 | Distinti ........................ | 341/158 |
| 5,426,378 A | | 6/1995 | Ong ............................. | 326/39 |
| 5,703,871 A | | 12/1997 | Pope et al. ................. | 370/248 |
| 5,828,693 A | | 10/1998 | Mays et al. .................. | 375/202 |
| 5,880,598 A | | 3/1999 | Duong ......................... | 326/41 |
| 6,011,407 A | * | 1/2000 | New ............................ | 326/39 |
| 6,018,559 A | | 1/2000 | Azegami et al. ............. | 377/79 |
| 6,066,961 A | * | 5/2000 | Lee et al. ..................... | 326/39 |
| 6,144,327 A | | 11/2000 | Distinti et al. .............. | 341/126 |
| 6,304,101 B1 | | 10/2001 | Nishihara .................... | 326/41 |

OTHER PUBLICATIONS

CYPR–CD00169; "Programmable Microcontroller Architecture (Mixedanalog/Digital)"; Aug. 7, 2001; 09/924,734; Snyder et al.

CYPR–CD00170; "Digital Configurable Macro Architecture"; Jul. 18, 2001; 09/909,045; W. Snyder.

CYPR–CD00172; "Configuring Digital Functions in a Digial Configurable Macro Architecture"; Jul. 18, 2001; 09/909,109; Snyder.

CYPR–CD00199; "Multiple use of Microcontroller Pad"; Jun. 26, 2001; 09/893,050; Kutz et al.

CYPR–CD00232; "Programmable System on a Chip"; Oct. 1, 2001; 10/033,027; W. Snyder.

* cited by examiner

*Primary Examiner*—Anh Q. Tran
(74) *Attorney, Agent, or Firm*—Murabito & Hao LLP

(57) ABSTRACT

A configurable input/output interface for a microcontroller. The present invention is an input/output (I/O) pin with a configurable interface to a microprocessor, and to a global mapping which selectively couples functional units on the microcontroller with the I/O pin. The I/O pin can be selectively coupled to the global mapping or to the microprocessor on each clock cycle. The mapping configuration selectively couples a different functional unit or units of the microcontroller to access the I/O pin on each clock cycle. The interface between the I/O pin and the rest of the system can be dynamically configured by software created or modified by a user, or by hardware. The present invention facilitates repositioning pin locations on a microcontroller because it is a software modification rather than a hardware modification. The present invention further enables the microcontroller functions to be configured by the user rather than by the microcontroller vendor.

15 Claims, 4 Drawing Sheets

CONFIGURABLE INPUT/OUTPUT INTERFACE FOR A MICROCONTROLLER

RELATED APPLICATIONS

The present application benefits from U.S. Patent application No. 60/243,708 filed Oct. 26, 2000 entitled Advanced Programmable Microcontroller Device by W. Snyder, M. Mar, B. Sullan, T. Lesher, H. Kutz, T. Nelson, C. Nemecek, and J. Shutt, assigned to the assignee of the present invention, and which is hereby incorporated by reference in its entirety herein.

BACKGROUND OF THE INVENTION

1. Field of the Invention

Embodiments of the present invention relate to the field of microcontroller devices. More specifically, embodiments of the present invention pertain to a configurable input/output interface for a microcontroller device.

2. Prior Art

Almost all microcontrollers in today's marketplace are general purpose units. This means that their market differentiation is obtained through customer application rather than the actual design of the microcontroller. Although there are thousands of microcontrollers available in the marketplace, there are only a few dozen types of peripherals in use. Many of these require special purpose microcontrollers built for specific functions. Better than 50% of the 6 billion-unit market are general purpose units. The remainder is broken into small segments that, surprisingly, are still often not market specific. Examples of these products are integrated Liquid Crystal Display (LCD) drivers and controllers and integrated communications protocols, such as Campus Area Network (CAN). These use general purpose chips that can be found in a variety of other devices on the markets.

Despite the thousands of different microcontrollers from more than 20 different vendors, designers still have trouble finding one that is a perfect fit for their application. Often, once the design has started, they find a better way to solve the problem, marketing requests a different feature set, or the design turns out to require more capability than previously estimated. In many of these situations, the designer ends up needing a completely different part description, and is unable to find one that is compatible with the work already completed.

One approach to the above stated problem is to ask for a custom configuration from a microcontroller manufacturer incorporating all of the necessary functions and thus eliminating external chips. This only works for very large volume customers, usually requires a Non Recurring Engineering (NRE), and once the design has begun, changes would cause major delays and increase costs. Custom Application Specific Integrated Circuits (ASICs) with processor cores are also available, but require a silicon design expertise not found in embedded system engineering teams. The long development times and large volume requirements still exist. Solutions for smaller designs and with greater flexibility can be found in gate arrays and programmable logic devices. However, these solutions still require silicon design expertise and tend to be much more expensive.

Typically, input/output pins on microcontrollers have a dedicated system function. For example, certain pins are coupled to a microprocessor, while other pins may be clock pins, data I/O pins, etc. These assignments are fixed because, depending on the system function determined for the pin, different hardware is required to be associated with the pin. This is one of the factors which limits microcontroller designs currently. For a microcontroller circuit to be fully programmable, the I/O pin assignments must be configurable as well. This would allow a designer greater flexibility in designing the circuit and, if necessary, to change the pin assignment later in the design process. Since the pin assignment would be a software modification only, no delays or extra costs would be incurred in, for example, moving a pin function to a different location on the microcontroller. Additionally, the pin count can be reduced if multiple circuit functions can be assigned to a given I/O pin. This would lead to a reduction of fabrication costs and an increase in circuit production.

It would be advantageous then, to provide a configurable input/output interface which gives designers the flexibility to specify which resource on the microcontroller device will be accessible to a given I/O pin. A further need exists for an I/O interface which can access the rest of the microcontroller device functions through a configurable interface and can be reconfigured dynamically.

SUMMARY OF THE INVENTION

Accordingly, embodiments of the present invention provide a configurable input/output interface which allows designers to specify which resource on the microcontroller device will be accessible to a given I/O pin. Furthermore, embodiments of the present invention can access the rest of the microcontroller device functions through a configurable interface and can be reconfigured dynamically (e.g., per clock cycle). The present invention provides a configurable input/output interface which gives designers the flexibility to easily create customized configurations which incur no NRE and require no unusual design skills.

The present invention is an input/output (I/O) pin with a configurable interface to a microprocessor, and to a global mapping which determines access to functional units on the microcontroller. The I/O pin can be selectively coupled to the global mapping or to the microprocessor on each clock cycle. The mapping configuration selectively couples a different functional unit or units of the microcontroller to access the I/O pin on each clock cycle. The interface between the I/O pin and the rest of the system can be dynamically configured by software created or modified by a user, or by hardware. The present invention facilitates repositioning pin locations on a microcontroller because it is a software modification rather than a hardware modification. The present invention further enables the microcontroller functions to be configured by the user rather than by the microcontroller vendor.

These and advantages of the present invention will become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrate embodiments of the present invention and, together with the description, serve to explain the principles of the invention.

DETAILED DESCRIPTION

Reference will now be made in detail to the preferred embodiments of the present invention, examples of which are illustrated in the accompanying drawings. While the present invention will be described in conjunction with the preferred embodiments, it will be understood that they are not intended to limit the present invention to these embodiments. On the contrary, the present invention is intended to cover alternatives, modifications and equivalents, which may be included within the spirit and scope of the present invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Notation and Nomenclature

Some portions of the detailed descriptions which follow are presented in terms of procedures, logic blocks, processing and other symbolic representations of operations on data its within a computer memory. These descriptions and representations are the means used by those skilled in the data processing arts to most effectively convey the substance of their work to others skilled in the art. A procedure, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, valued, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "providing," "coupling," "reconfiguring," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such Information storage, transmission or display devices.

Figure 1:
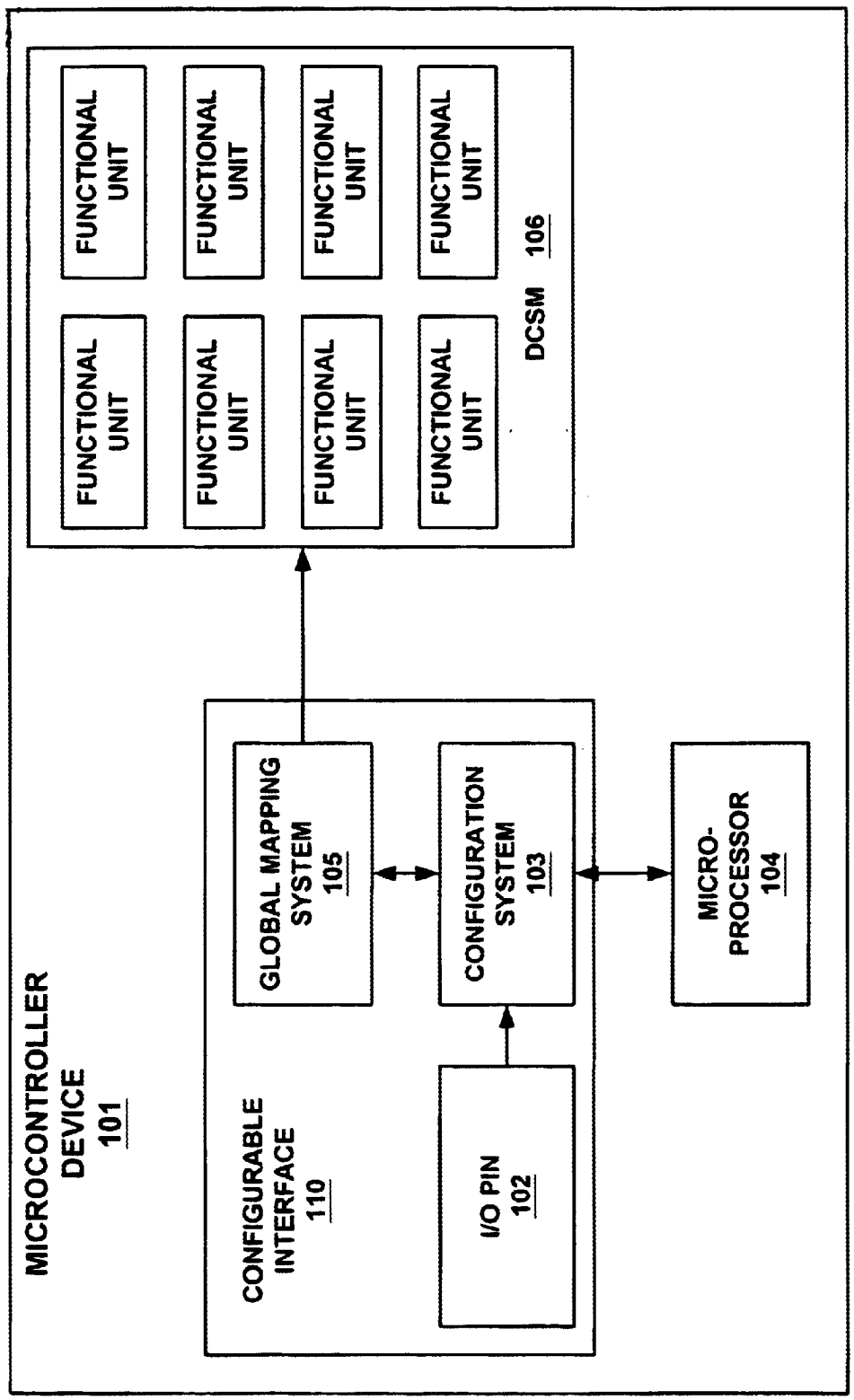
FIG. 1 is a block diagram of a microcontroller device with a configurable input/output interface as embodied by the present invention.

FIG. 1 is a block diagram showing a microcontroller device 101 having a configurable interface 110 consisting of input/output (I/O) pin 102, configuration system 103, and global mapping system 105. Configuration system 103 can, depending upon its configuration, selectively couple I/O pin 102 with either a microprocessor 104 or global mapping system 105. Global mapping system 105 is coupled with a plurality of functional units of Digital Configurable System Macro (DCSM) 106. Global mapping system 105 selectively couples I/O pin 102 with a selected functional unit or units of DCSM 106.

The functional units of DCSM 106 are programmable digital and analog units which can be configured and connected by a user as needed to create a customized microcontroller device. The digital units can be timers, controllers, serial communications units, Cycle Redundancy Check (CRC) generators, Universal Asynchronous Receiver/Transmitters (UARTs), etc. For functions that require higher precision or counting, the digital units can be combined. The analog units are programmable operational amplifier circuits which can be interconnected to create a desired amplifier circuit. Typical peripherals that can be created are amplifiers, programmable gain, digital to analog converters, analog to digital converters, analog drivers, and high-, low-, and band-pass filters, etc. Higher order user modules such as modems, complex motor control, and complete sensor signal chains can be created from these building blocks. The ability to program microcontroller device 101 to suit a particular application necessitates a reconfigurable I/O interface which is provided by the present invention.

Figure 2:
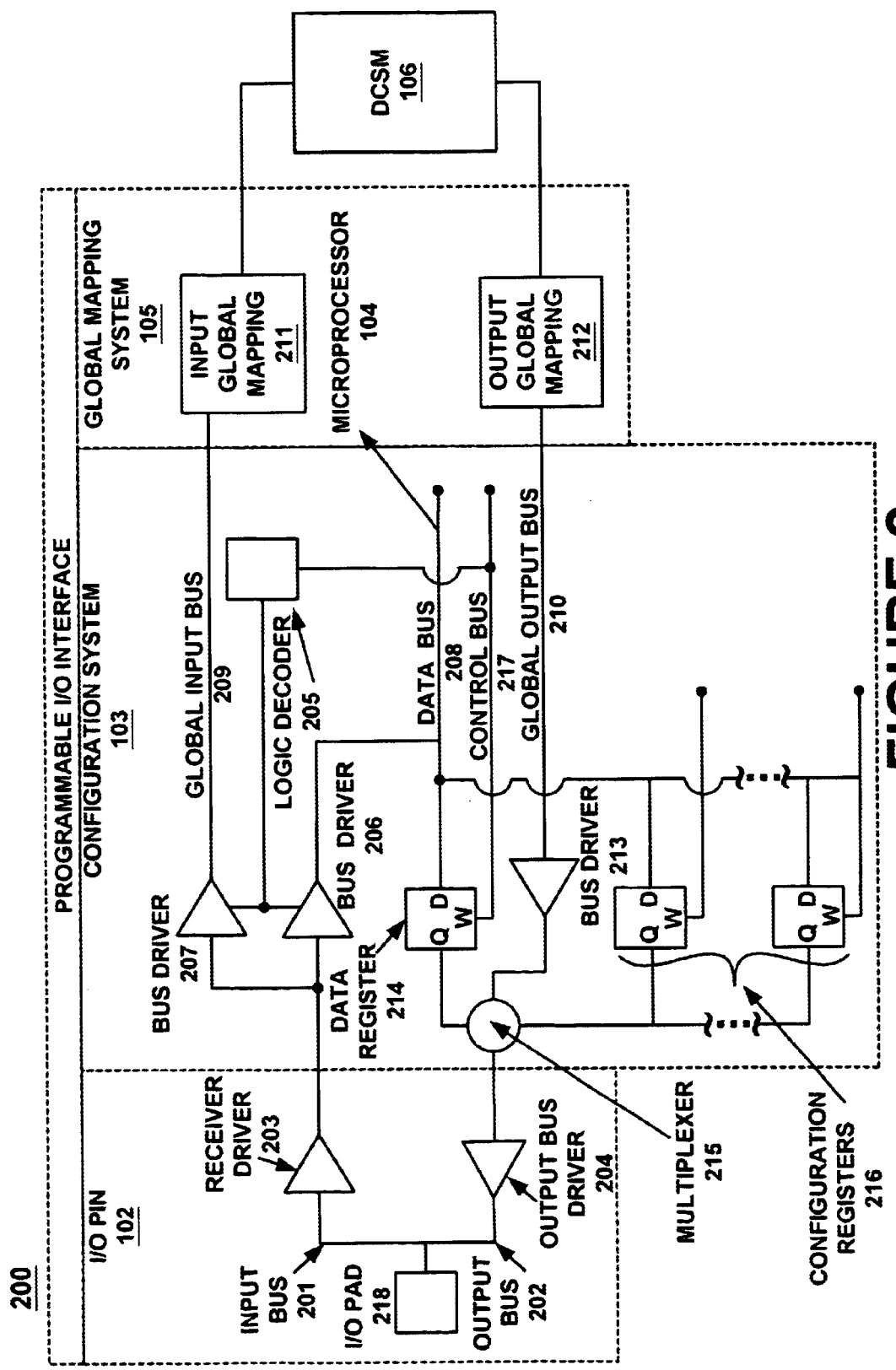
FIG. 2 is a block diagram of a configurable input/output interface as embodied by the present invention.

FIG. 2 is a block diagram of a configurable input/output interface 200 for a microcontroller as embodied by the present invention. For purposes of clarity, the following discussion will utilize the block diagram of FIG. 2 with flow chart 300 of FIG. 3, to describe one embodiment of the present invention.

In one embodiment, I/O pin 102 and configuration system 103 are integrated into a pin unit. A plurality of these integrated pin units are combined to create a port. However, each of the pin units in a port is still operable to be addressed individually by global mapping system 105. In one embodiment, 8 of these integrated pin units comprise each port. However, while the present embodiment recites an 8-pin port, the present invention is well suited to utilize ports with other numbers of pins as well. An 8 pin port is recited so that disproportionate amounts of addressing resources are not used by the I/O interfaces.

Figure 3:
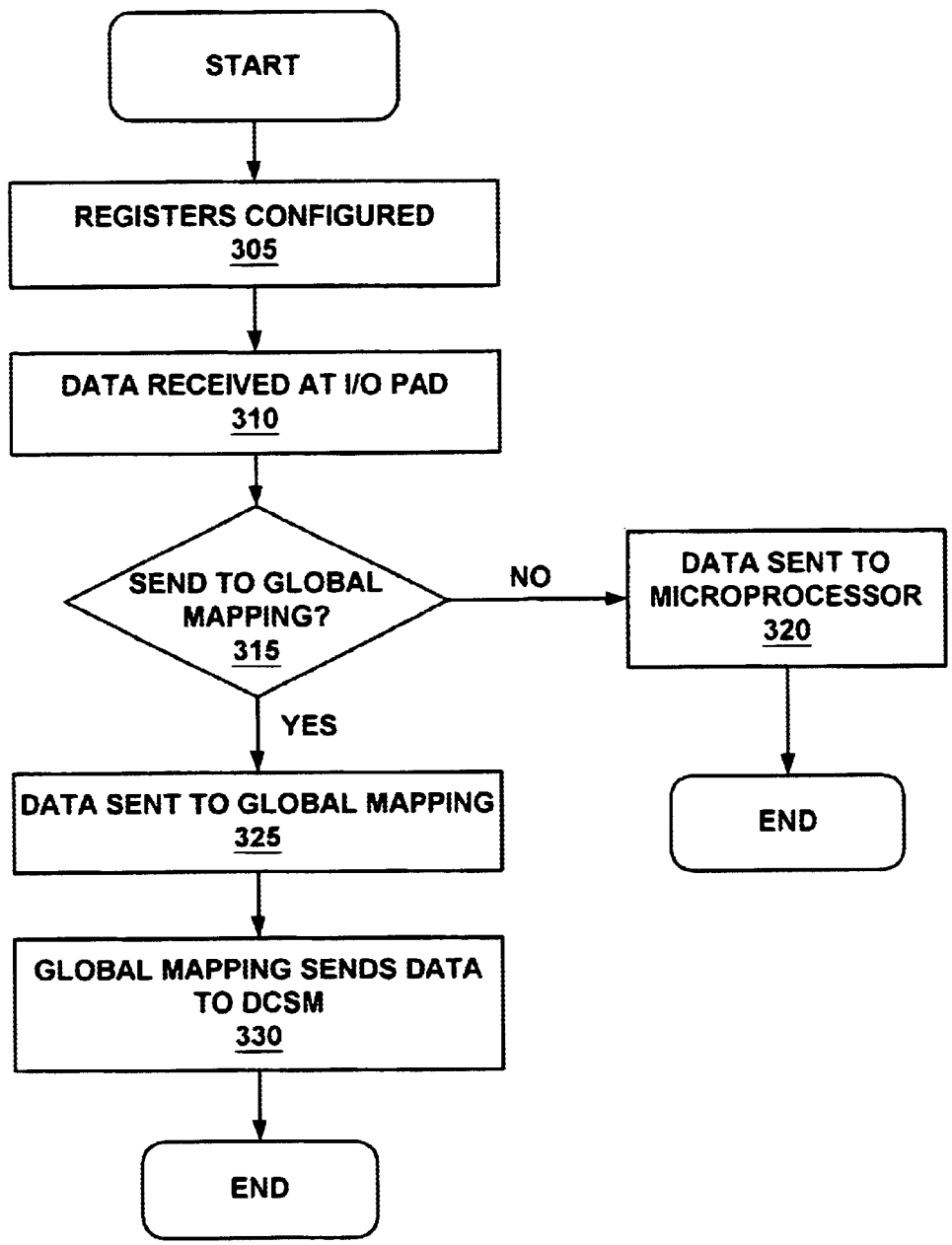
FIG. 3 is a flowchart of a process 300 for using a configurable input/output interface for a microcontroller to input data as embodied by the present invention.

With reference to FIG. 2 and to step 305 of FIG. 3, the registers of configuration system 103 and global mapping system 105 are configured. For an input operation, these registers are in logic decoder 205 and the Input global mapping 211. This configuration information can be sent from microprocessor 104 (shown in FIG. 1). However, the configuration of the global mapping is not exclusively limited to the microprocessor. Other mechanisms on microcontroller 101 which are capable of changing the configuration bits, such as a state machine, flash bits, or static RAM, can be used to change the configuration.

Global mapping system 103 is maintained by a control program which supplies the logic to selectively couple I/O pin 102 with functional units of DCSM 106. The programming of the control program is done by the user which allows greater flexibility than using a pre-determined mapping scheme provided by a silicon vendor. The control program also facilitates reconfiguring pin assignment because it is now a software modification rather than a hardware modification.

Customer firmware initializes a particular mapping by writing the configuration to registers associated with the global map. The configuration of the mapping can be changed at any time (e.g., per clock cycle). The global mapping system allows, for example, 4 separate functional units on DCSM 106 to send 4 different signals through the same I/O pin by coupling a particular signal from a functional unit of the DCSM to the I/O pin from cycle to cycle. In another example, a single clock signal can be simultaneously coupled to 4 different I/O pins. This facilitates interfacing with resources on microcontroller device 101 in multiple ways, either from a single or multiple pin configuration.

With reference to FIG. 2 and to step 310 of FIG. 3, data is received at I/O pad 218, and directed through receiver driver 203 by way of input bus 201.

With reference to FIG. 2 and to step 315 of FIG. 3, a logic operation is performed to determine whether data is sent to global mapping system 105 or to microprocessor 104. Depending on the configuration of logic decoder 205 done in step 305, the data is sent either to input global mapping 211 of global mapping system 105 or to microprocessor 104. A signal from control bus 217 indicates to logic decoder 205 which bus driver to enable.

With reference to FIG. 2 and to step 320 of FIG. 3, the data is sent to microprocessor 104 and process 300 ends at this point. Bus driver 206 couples I/O pad 218 to data bus 208, thus giving microprocessor 104 access to the circuit.

With reference to FIG. 2 and to step 325 of FIG. 300, data is sent to input global mapping 211. This is the result of logic decoder 205 being configured by the control program to send the data to global mapping system 105 in step 305. Bus driver 207 couples I/O pin 102 to global input bus 209 and thus to input global mapping 211.

With reference to FIG. 2 and to step 330 of FIG. 3, input global mapping 211 sends the data to the DCSM 106 and process 300 ends at this point. Global mapping 211 is configured by the control program in step 305 to send the data to a specific functional unit or units of DOSM 106.

Figure 4:
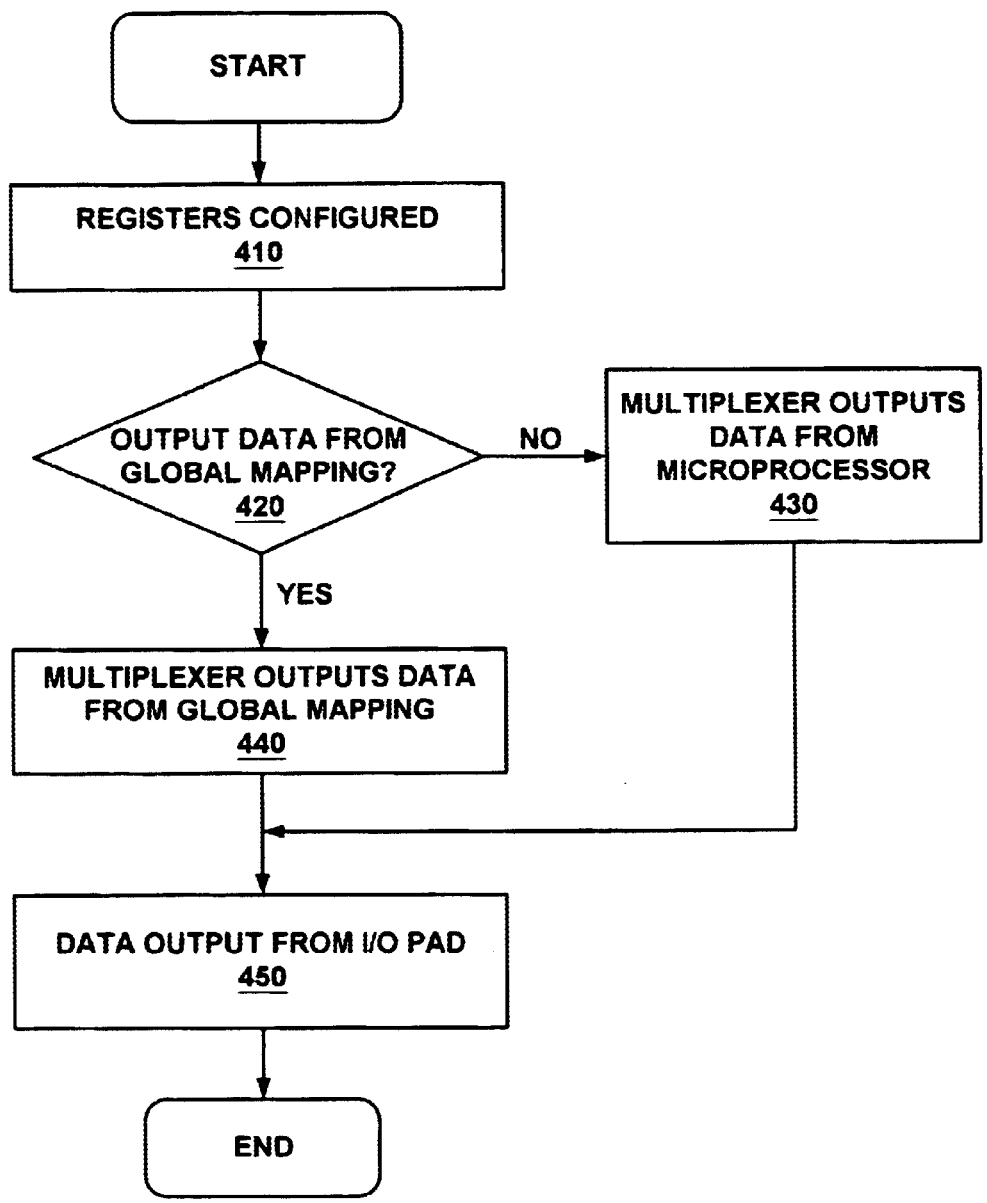
FIG. 4 is a flowchart of a process 400 for using a configurable input/output interface for a microcontroller to output data as embodied by the present invention.

FIG. 4 is a flowchart of a process 400 for using a configurable input/output interface for a microcontroller to output data as embodied in the present invention. For purposes of clarity, the following discussion will utilize the block diagram of FIG. 2 with flow chart 400 of FIG. 4, to describe one embodiment of the present invention.

Referring to FIG. 2 and to step 410 of FIG. 4, the registers of configuration system 103 and global mapping system 105 are configured. For an output operation, the registers are the configuration registers 216 and the output global mapping 212 registers. Again, a control program configures configuration registers 215 and output global mapping 212 to selectively couple I/O pin 102 with a functional unit or units of DCSM 106 or with microprocessor 104. The configuration can be done by microprocessor 104, or any mechanism on microcontroller 101 which is capable of changing the configuration bits, such as a state machine, flash bits, or static RAM , and can be changed at any time (e.g., per clock cycle).

Configuration registers 216 can also be configured to provide a variety of system functions for the I/O interface of the present invention and which can be reconfigured at any time (e.g., per clock cycle). For example, configuration registers 216 provide the capability for programmable pull-up or pull-down resistors, programmable interrupts per pin (e.g., positive edge triggered, negative edge triggered, or triggered on any change), programmable interrupt polarities and modes, and programmable drive strength. In one embodiment of the present invention, there are 8 configuration registers for each I/O pin allowing a maximum of 256 functions which could be defined for each pin. However, 2 or more registers can be used to control a particular pin function. For example, 2 registers can be used for the I/O driver to provide 4 drive strength levels, 2 registers used for interrupt polarity, etc. Thus the present invention is well suited to various register configurations to provide more or less system functions as needed.

Referring to FIG. 2 and to step 420 of FIG. 4, a logic operation takes place where multiplexer 215 reads the configuration information held in configuration registers 216 and selectively couples data from either microprocessor 104 or output global mapping 212 to output bus 202.

With reference to FIG. 2 and to step 430 of FIG. 4, multiplexer 215, as a result of the configuration of registers 216, couples data register 214 to output bus driver 204 and output bus 202. In so doing, data held in data register 214 from microprocessor 104 will be output later in process 400. A signal from control bus 217 will enable data register 214 to shift the data out to multiplexer 215.

With reference to FIG. 2 and to step 440 of FIG. 2, multiplexer 215, as a result of the configuration of registers 215, couples output global mapping 212 to output bus 102 through bus driver 213. This allows data from a functional unit or units of DCSM 106 to be output later in process 400. Global output bus 210 couples output global mapping 212 with output bus driver 213, and multiplexer 215.

With reference to FIG. 2 and to step 450 of FIG. 4, data selected at step 420 of FIG. 4 is output from I/O pad 218 and process 400 ends at this point.

Thus, the present invention provides a configurable I/O interface for a microcontroller which allows a designer the flexibility to easily create customized configurations, incurs no NRE, and requires no unusual design skills. The present invention allows a microcontroller device to be reconfigured dynamically without being limited by pin configuration. The present invention further allows selectively coupling an I/O pin to a microprocessor or a plurality of functional units on the microcontroller device and to reconfigure this coupling per clock cycle.

The preferred embodiment of the present invention, a configurable input/output (I/O) interface for a microcontroller, is thus described. While the present invention has been described in particular embodiments, it should be appreciated that the present invention should not be construed as limited by such embodiments, but rather construed according to the following claims.

What is claimed is:

1. In a microcontroller having a microprocessor, an input/output interface comprising:
    a) an input/output pin;
    b) a global mapping system for selectively coupling said input/output pin to a plurality of functional units of said microcontroller; and
    c) a configuration system for defining a system function for said input/output pin and for selectively coupling said input/output pin to one of said microprocessor and to said global mapping system.

2. The microcontroller as recited in claim 1, wherein said global mapping system and said configuration system further comprise a plurality of registers.

3. The microcontroller as recited in claim 2, wherein said microprocessor can dynamically configure said plurality of registers of said global mapping system and said configuration system.

4. The microcontroller as recited in claim 3, wherein said configuration of said global mapping system and said configuration system are supplied by a control program.

5. The microcontroller as recited in claim 1, wherein said global mapping system further comprises an input global mapping for receiving data and an output global mapping for transmitting data.

6. A circuit comprising:
   a) an input/output pin coupled with a microprocessor, a global mapping system, and a plurality of configuration registers for defining a system function of said circuit and for selectively coupling said input/output pin to one of said microprocessor and said global mapping system; and
   b) a plurality of functional units coupled to said global mapping system.

7. The circuit as recited in claim 6, wherein said plurality of configuration registers selectively couple said input/output pin to said microprocessor and said global mapping system.

8. The circuit as recited in claim 6, wherein said plurality of configuration registers can be dynamically reconfigured.

9. The circuit as recited in claim 6, wherein said global mapping system further comprises a plurality of registers for selectively coupling said input/output pin to said plurality of functional units.

10. The circuit as recited in claim 9, wherein said plurality of registers of said global mapping system can be dynamically reconfigured.

11. A method for providing a configurable input/output interface for a microcontroller comprising:

a) coupling an input/output pin to a microprocessor and a global mapping system;
   b) coupling said global mapping system to a plurality of functional units of said microcontroller; and
   c) utilizing a configuration system to selectively couple said input/output pin to one of said microprocessor and said global mapping system.

12. The method for providing a configurable input/output interface for a microcontroller as recited in claim 11, wherein step a) further comprises providing a configuration system for selectively coupling said microprocessor to said global mapping system.

13. The configuration system as recited in claim 12 further comprising a plurality of registers which can be dynamically reconfigured.

14. The method for providing a configurable input/output interface for a microcontroller as recited in claim 11, wherein said global mapping system selectively couples said input/output pin to said plurality of functional units.

15. The method for providing a configurable input/output interface for a microcontroller as recited claim 14, wherein said global mapping system further comprises a plurality of registers which can be dynamically reconfigured.

* * * * *